Sept. 9, 1958   R. E. KRAFT ET AL   2,851,148
CONVEYOR MECHANISM
Filed Nov. 27, 1956   3 Sheets-Sheet 1

Sept. 9, 1958     R. E. KRAFT ET AL     2,851,148
CONVEYOR MECHANISM
Filed Nov. 27, 1956     3 Sheets-Sheet 2

United States Patent Office 2,851,148
Patented Sept. 9, 1958

2,851,148

CONVEYOR MECHANISM

Robert E. Kraft and James H. Snodgrass, Chicago, Ill., assignors to Link-Belt Company, a corporation of Illinois Application November 27, 1956, Serial No. 624,612

5 Claims. (Cl. 198—94)

This invention relates to new and useful improvements in apparatus for conveying materials and deals more particularly with a common drive for horizontal and vertical conveyor units that are operatively connected in series.

It is the primary object of this invention to provide a feed screw for conveying material along a variably inclined path and into one end of the boot of a bucket elevator with said elevator and screw being connected for joint operation by a common drive in such a manner as to permit rapid and easy adjustment of the relative rates of operation of the elevator and screw.

Another important object of the invention is to provide a jointly driven material conveying bucket elevator and feed screw with the elevator and screw being so associated as to permit variations in the selected location of the feed opening in the elevator boot and angular adjustment of the feed screw away from a horizontal position.

Other objects and advantages of the invention will be apparent during the course of the following description.

Figure 1:
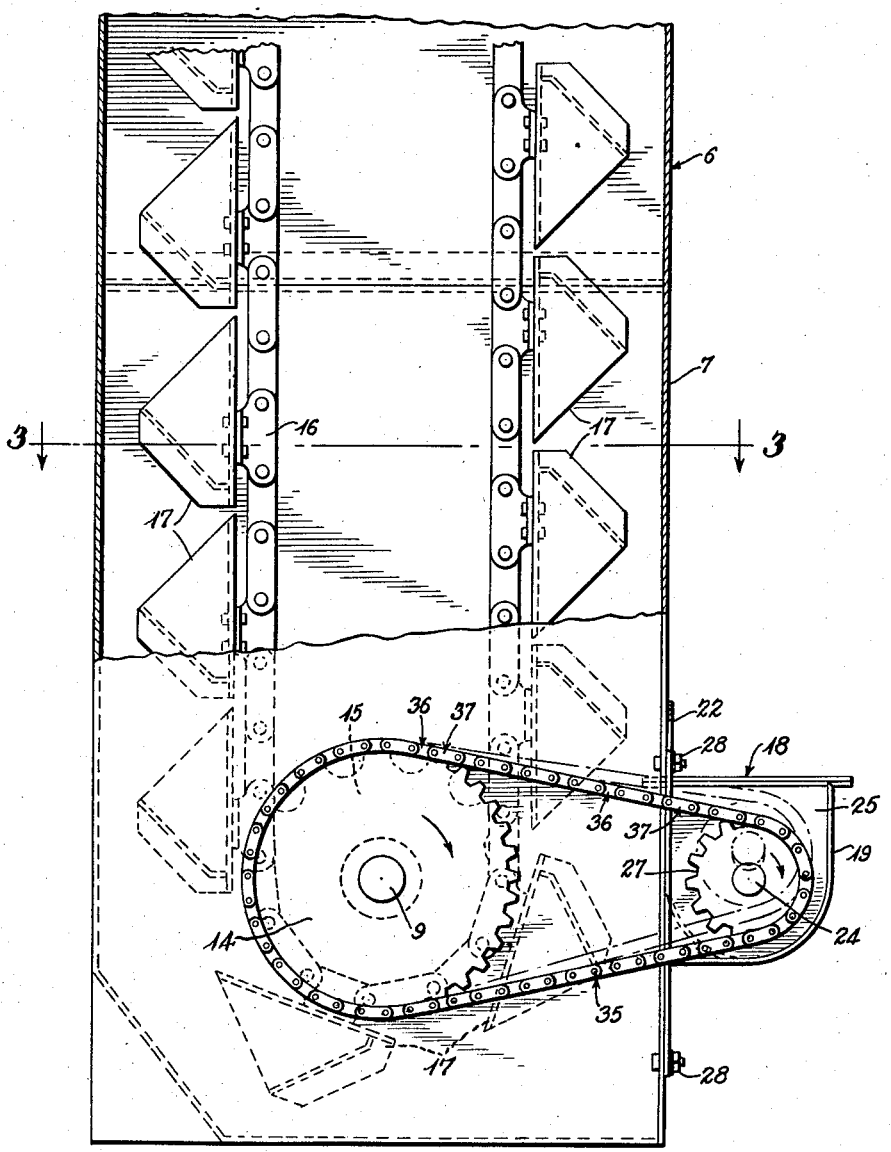
Figure 2:
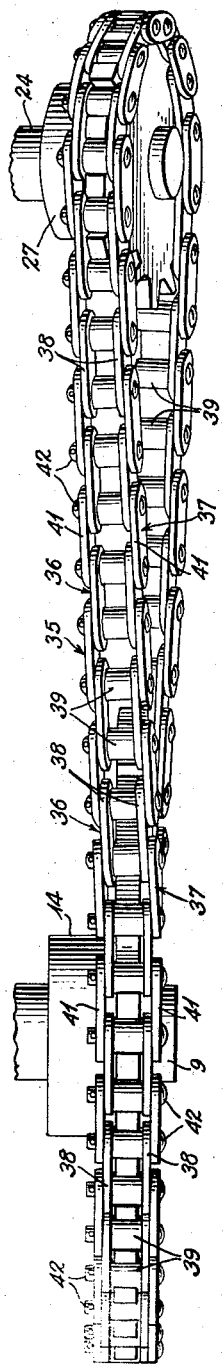
Figure 3:
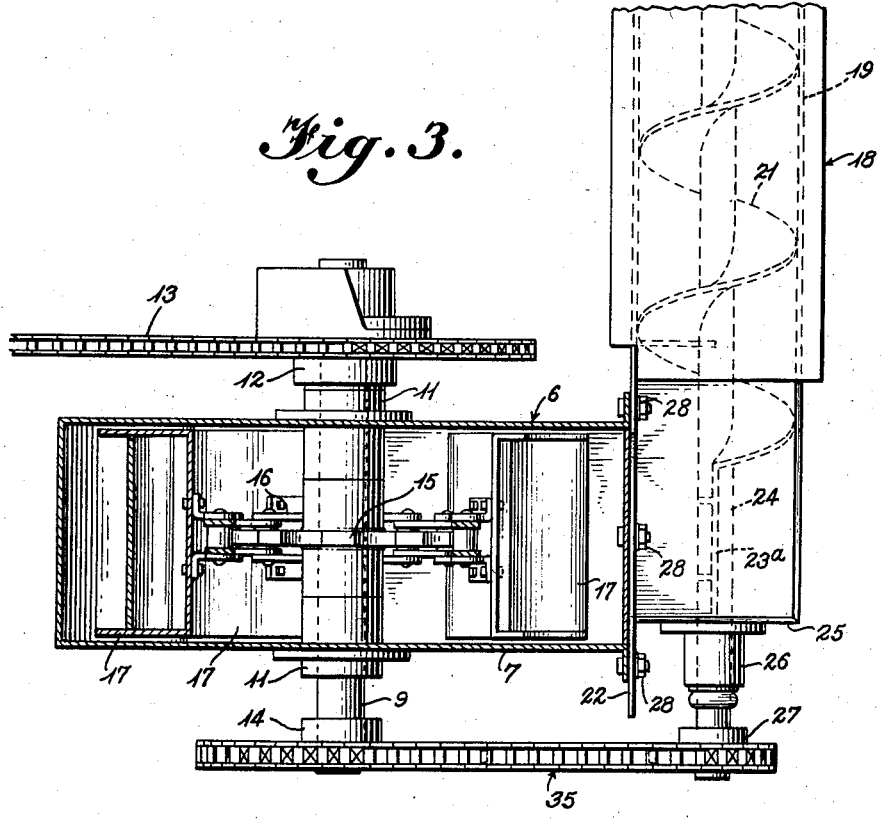
Figure 4:
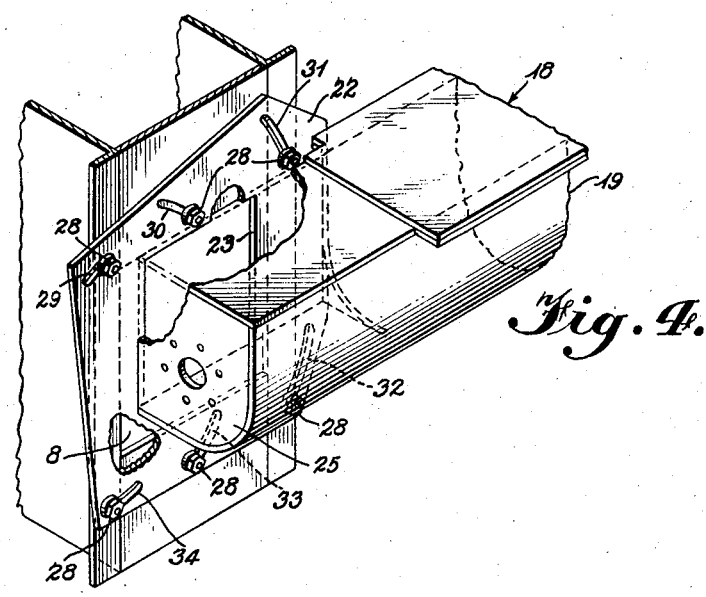

In the accompanying drawings forming a part of this specification and in which like reference characters are employed for designating like parts throughout the same, Figure 1 is a side elvational view, partly broken away, of the boot portion of a bucket elevator and the associated end portion of a screw for feeding material thereto, Figure 2 is an end elevational view, partly broken away, of the bucket elevator boot and feed screw taken at right angles to Fig. 1, Figure 3 is a horizontal sectional view taken on line 3—3 of Fig. 1, Figure 4 is a fragmentary perspective view of the bucket elevator boot and feed screw housing and, Figure 5 is a fragmentary top plan view of the driving connection between the foot shaft of the bucket elevator and the shaft of the feed screw with the latter in an inclined position.

In the drawings, wherein for the purpose of illustration is shown the preferred embodiment of the invention, and first particularly referring to Figs. 1 to 3, inclusive, there is shown a portion of a bucket elevator designated in its entirety by the reference character 6. At the foot of the bucket elevator 6 there is provided a housing or boot 7 which is rectangular in horizontal cross section and, as illustrated in Fig. 4, has an opening 8 in one of its end walls through which the material to be elevated is fed.

Extending transversely through the lower portion of the boot 7 is a foot shaft 9 which is centered between the two end walls of the boot and is supported for rotation on the two side walls of the boot by bearing cartridges 11. The opposite end portions of the shaft 9 extend laterally outwardly beyond the two bearing cartridges 11 and one of the end portions has mounted thereon a drive sprocket 12 which is drivingly connected to any suitable prime mover, not shown, by a chain 13. The opposite end portion of the shaft 9 has mounted thereon a sprocket 14, the purpose of which will be later described.

Keyed to the shaft 9 between the inner ends of the two bearing cartridges 11 is a foot sprocket 15. The lower end loop of an elevator chain 16 is trained around the sprocket 15 for driving engagement thereby to move the chain through its vertically elongated closed path. Buckets 17 are mounted at spaced points along the chain 16 and extend outwardly from its path of movement with each of the buckets opening in the general direction of movement of the chain so that as they are moved through the lowermost portion of the boot 7 they will scoop material from the bottom of the boot and carry the material to the uppermost portion of the elevator where it will be discharged in any suitable manner.

Adjustably mounted on the end wall of the boot 7 through which the feed opening 8 is formed is a feed screw unit designated in its entirety by the reference character 18. Material may be introduced to the screw unit 18 from any suitable source of supply, not shown, and will be fed along a horizontal or an inclined path, in accordance with the elevation of the supply source relative to the feed opening 8, as will be later described.

Throughout a major portion of its length, the screw unit 18 has a U-shaped trough or housing 19 the bottom curvature of which conforms with that of the helix or screw 21 that is positioned in the housing. The end portion of the screw unit 18 adjacent the boot 7, however, is modified by the provision of a flat mounting plate 22 which forms one side wall of the housing 19 and has an opening 23 therethrough for the discharge of material from the unit. The screw 21 extends along the inner side of the plate 22 to the opening 23 and a radially extending kicker vane 23a is mounted to extend longitudinally along the portion of the screw shaft opposite the opening for pushing material from the housing 19 through the opening. The screw shaft 24 is rotatably supported on the end plate 25 of the feed screw unit 18 by a bearing cartridge 26. The shaft 24 extends outwardly beyond the bearing unit 26 and has mounted thereon a sprocket 27 which, with the trough 19 supported in a horizontal position, is radially aligned with the sprocket 14 on the foot shaft 9.

The upper and lower marginal portions of the mounting plate 22 extend beyond the top and bottom, respectively, of the housing 19 and are connected to the end wall of the boot 7 above and below the feed opening 8 by bolts 28 which extend through openings in the end wall of the boot 7 and through aligned, arcuately formed slots 29 to 31, inclusive, in the upper marginal portion of the mounting plate and slots 32 to 34, inclusive, in the lower marginal portion of the mounting plate. By reference to Fig. 2, it will be noted that all of the slots 29 to 34, inclusive, are concentrically formed with the center of the curvature of the slots lying on a line which passes horizontally through and is in normal relationship with the axis of the feed screw shaft 24 and the axis of the foot shaft 9. It will also be noted that all of the slots 29 to 34, inclusive, extend from their associated bolts 28 in a counterclockwise direction as viewed in Fig. 2. It will be readily apparent, therefore, that with the bolts 28 in a slightly loosened condition, the housing 19 of the screw conveyor unit 18 may be pivoted in a clockwise direction about the center of concentricity of the slots, as illustrated by broken lines in Fig. 2. On the other hand, the bolts 28 may be tightened to rigidly support the housing 19 on the boot 7 either in a horizontal position or at a selected position between the horizontal and the maximum angle of inclination of the housing as determined by the movement of the ends of the slots 29 to 34, inclusive, into engagement with the bolts.

The sprocket 27 mounted on the screw shaft 24 and the sprocket 14 mounted on the foot shaft 9 are drivingly connected by a chain 35 so that rotation of the foot shaft to operate the bucket elevator 6 will also impart rotation to the screw shaft 24 to cause the screw unit 18 to feed material into the boot 7 of the bucket elevator. By reference to Fig. 2, it will be seen that the two sprockets 27 and 14 will be radially aligned when the feed screw 18 is in its horizontal position. When the screw is moved out of its horizontal position into an inclined position as illustrated by the broken lines of Fig. 2, however, the sprocket 27 will be tilted out of the plane of the sprocket 14 and, due to the angular relationship between these two sprockets, some twist will be imparted to the chain 35 along the portions of its length which lie between the two sprockets.

In order that the chain 35 may absorb the twist imparted thereto by its movement around two sprockets in angularly related planes, the chain is of a special construction which is fully illustrated and described in United States Patent No. 1,945,357, issued to H. S. Pierce on January 30, 1934, for Chain. The chain structure will be only briefly described as follows:

By reference to Fig. 5, it will be seen that the chain 35 is formed of alternately arranged inside and outside links 36 and 37, respectively. Each inside link 36 includes a pair of laterally spaced side bars 38 connected at their opposite end portions by bushings, or the like, not shown. Rollers 39 are positioned on the bushings at the opposite end portions of each inside link 36. Each outside link 37 is formed of a pair of spaced side bars 41, the opposite end portions of which are arranged in longitudinally overlapped relationship with the end portions of their adjacent inside links 36 and holes are provided in the opposite end portions of each side plate 41 for receiving chain pins 42 which extend between the side plates through the bushings of the overlapped end portions of the adjacent inside links.

It will be readily apparent that the adjacent inside links 36 and outside links 37 of the chain 35 are free to partake of relative pivotal movement about the axes of their connecting chain pins 42. Twisting of the chain 35, however, is made possible only by the provision of clearance spaces between the chain pins 42 and the associated bushings of the inside links 36. These clearance spaces are so located that the pins 41 may partake of limited pivotal movement relative to their associated bushings in planes normal to the longitudinal center line of the chain 35. In other words, adjacent inside links 36 and outside links 37 of the chain 35 are capable of movement relative to each other about the longitudinal center line of the chain.

The operation of the bucket elevator 6 and the feed screw 18 for feeding material thereto will be readily apparent from the above description of the two units and will be only briefly described as follows:

With the bucket elevator 6 installed in a selected position, the feed screw 18 is loosely mounted on the boot 7 and is adjusted to position the feed end thereof in proper relationship with a source of supply of material. When so adjusted, the screw unit 18 may be in a horizontal position or in an inclined position as determined by the elevation of the source of supply of material relative to the elevation of the feed opening 8 in the boot 7. It will be noted that the size of the feed opening 8 is greater than that of the discharge opening 23 through the plate 22 so that the discharge opening is aligned with the feed opening in all positions of adjustment of the housing 19. After the position of the screw unit 18 has been properly adjusted, the bolts 28 are tightened to secure the screw housing 19 in its adjusted position.

The sprockets 27 and 14 are selected with diameters and corresponding numbers of teeth to provide a proper relationship between the rate of rotation of the screw shaft 24 and the rate of movement of the buckets 17 through the boot 7. In other words, material will be fed to the boot 7 by the screw 21 at a rate at which it can be handled by the bucket elevator 6 when the foot sprocket 15 is rotated at its proper corresponding speed. It will be readily apparent that alternate pairs of different sized sprockets 27 and 14 may be quickly and easily substituted for those in use on the device if a change in the type or characteristics of the material makes a change in the relative rates of operation of the feed screw 18 and the bucket elevator 6 desirable.

The chain 35 is trained around the two sprockets 27 and 14 to provide positive driving connection therebetween in all positions of adjustment of the feed screw housing 19. When the bucket elevator 6 is set in operation by movement of the drive chain 13 to rotate the sprocket 12, the sprocket 14 on the foot shaft 9 will be rotated to impart movement to the drive chain 35 and to rotate the sprocket 27 and the feed screw shaft 24 so that material will be fed along the screw housing 19 and through the discharge opening therefrom into the feed opening 8 of the elevator boot 7.

It is to be understood that the form of this invention herewith shown and described is to be taken as a preferred example of the same, and that various changes in the size, shape and arrangement of parts may be resorted to without departing from the spirit of the invention or the scope of the subjoined claims.

Having thus described the invention, we claim:

1. The combination with a bucket elevator having at its lower end an enclosed boot with a feed opening in one end wall thereof through which the material to be elevated is fed and a horizontally arranged foot shaft extending laterally therethrough, and a feed screw having a housing and a screw shaft extending longitudinally thereof, of means for effecting angular adjustment of said feed screw relative to said bucket elevator, said means including a drive sprocket mounted on said screw shaft adjacent one end portion of said housing and forming a positive driving connection between said foot shaft and said screw shaft in the various positions of adjustment of the latter, a flat mounting plate at one side of said one end portion of said housing, said plate having an opening therethrough for the discharge of material from said housing and having mounting portions extending vertically above and below the top and bottom, respectively, of the housing, said mounting portions each having a plurality of arcuate slots therethrough, each having a common center of curvature located on the line extending through the center of said drive sprocket normal to said plate, and a plurality of bolts extending through said slots and aligned openings in said one end wall of the boot for supporting the housing on the boot for pivotal adjustment in a vertical plane about the line through said center of curvature of said slots and with the discharge opening of the plate aligned with the feed opening of the boot and for securing said housing to the boot in a selected position of adjustment.

2. The combination of a bucket elevator having at its lower end an enclosed boot with a feed opening in one end wall thereof through which the material to be elevated is fed, a horizontally arranged foot shaft extending laterally through said boot, a screw conveyor for feeding material to said feed opening, said screw conveyor having a housing with a discharge opening therein aligned with said feed opening and a screw shaft extending longitudinally of said housing, and common drive means for rotating said foot shaft and said screw shaft, said drive means including a driven sprocket connected to said screw shaft adjacent the discharge end of said screw conveyor and a drive sprocket for said driven sprocket, the improvement comprising means for effecting angular adjustment of said screw conveyor relative to said bucket elevator, said adjusting means comprising two superimposed parts, comprising the portion of said enclosed boot surrounding said feed opening and a mounting plate, through which said discharge opening is formed, rigidly connected to said screw conveyor housing at the discharge end thereof, one of said parts having formed therethrough a plurality of arcuate slots each having a common center of curvature located on the line passing through the centers of said sprockets, a plurality of fastening elements each extending from the other of said parts through a respective one of said slots for securing said plate to said boot portion after said housing has been angularly adjusted by pivotal movement about the center of curvature of said slots, and a flexible drive chain trained about said sprockets, the flexibility of said chain permitting twisting thereof along the length of the chain between said sprockets when the screw shaft is adjusted to tilt said driven sprocket out of the plane of said drive sprocket.

3. The combination with a bucket elevator having a boot with a feed opening in one end wall thereof through which the material to be elevated is fed and a horizontally arranged foot shaft extending laterally therethrough, and a feed screw having a housing with a discharge opening therein and a screw shaft extending longitudinally thereof, of means for adjustably mounting said feed screw housing on said one end wall of the boot with said discharge opening of the housing aligned with the feed opening of said boot, adjustment of said housing effecting angular movement of the housing and its associated shaft in a vertical plane that is spaced from and parallel with said foot shaft, a sprocket mounted on each of said shafts, and a flexible drive chain trained about said sprockets, the flexibility of said chain permitting twisting thereof along the length of the chain between said sprockets when the screw shaft is adjusted to tilt its associated sprocket out of the plane of the sprocket mounted on said foot shaft.

4. The combination defined in claim 3 further characterized by said drive chain comprising alternately arranged inside and outside links, and chain pins connecting the adjacent links of said chain for relative pivotal movement therebetween about an axis extending transversely of the chain and for limited relative pivotal movement therebetween about the longitudinal center line of the chain to permit said twisting of the latter.

5. The combination with a bucket elevator having a boot with a feed opening in one end wall thereof through which the material to be elevated is fed and a horizontally arranged foot shaft extending laterally therethrough, and a feed screw having a housing and a screw shaft extending longitudinally thereof, of a flat mounting plate at one side of one end portion of said housing, said plate having an opening therethrough for the discharge of material from said housing and having mounting portions extending vertically above and below the top and bottom, respectively, of the housing, said mounting portions each having a plurality of arcuate slots therethrough that are concentrically formed about a line normal to said plate and extending through the axes of said screw shaft and said foot shaft in normal relationship therewith, said line of concentricity of said slots being located in closely spaced relationship with the end of said housing adjacent said mounting plate, a plurality of bolts extending through said slots and aligned openings in said one end wall of the boot for supporting the housing on the boot for pivotal adjustment in a vertical plane about the line through said point of concentricity of said slots and with the discharge opening of the plate aligned with the feed opening of the boot and for securing said housing to the boot in a selected position of adjustment and a sprocket mounted on each of said shafts adjacent said line of concentricity, a flexible drive chain trained about said sprockets, the flexibility of said chain permitting twisting thereof along the lengths of the chain between said sprockets when the housing is adjusted to tilt the screw shaft and its associated sprocket.

References Cited in the file of this patent

UNITED STATES PATENTS

| 391,061 | Mey | Oct. 16, 1888 |
| 1,518,898 | Brunner | Dec. 9, 1924 |
| 2,679,921 | Best | June 1, 1954 |

FOREIGN PATENTS

| 519,867 | Canada | Dec. 27, 1955 |